(12) United States Patent
Yajima et al.

(10) Patent No.: US 8,827,499 B2
(45) Date of Patent: Sep. 9, 2014

(54) OPTICAL MODULE

(75) Inventors: Masatoshi Yajima, Osaka (JP); Katsumi Goto, Hyogo (JP)

(73) Assignee: Panasonic Corporation, Osaka (JP)

( * ) Notice: Subject to any disclaimer, the term of this patent is extended or adjusted under 35 U.S.C. 154(b) by 428 days.

(21) Appl. No.: 13/389,513

(22) PCT Filed: Jul. 13, 2011

(86) PCT No.: PCT/JP2011/004001
§ 371 (c)(1),
(2), (4) Date: Feb. 8, 2012

(87) PCT Pub. No.: WO2012/029230
PCT Pub. Date: Mar. 8, 2012

(65) Prior Publication Data
US 2012/0257398 A1     Oct. 11, 2012

(30) Foreign Application Priority Data

Aug. 30, 2010  (JP) .................................. 2010-191810

(51) Int. Cl.
G11B 7/127     (2012.01)
G11B 7/1275    (2012.01)
G11B 7/22      (2006.01)
G11B 7/00      (2006.01)

(52) U.S. Cl.
CPC G11B 7/22 (2013.01); G11B 7/127 (2013.01); G11B 7/1275 (2013.01); G11B 2007/0006 (2013.01)
USPC ....................... 362/294; 362/373; 362/249.02

(58) Field of Classification Search
None
See application file for complete search history.

(56) References Cited

U.S. PATENT DOCUMENTS

| | | |
|---|---|---|
| 2003/0109602 A1 | 6/2003 | Mogi et al. |
| 2005/0171315 A1 | 8/2005 | Wakabayashi et al. |
| 2006/0120226 A1 | 6/2006 | Mutou et al. |
| 2006/0264545 A1 | 11/2006 | Wakabayashi et al. |
| 2010/0002561 A1 | 1/2010 | Oozeki et al. |
| 2011/0110108 A1* | 5/2011 | Calon et al. ................. 362/373 |
| 2011/0298387 A1* | 12/2011 | Kaneda et al. ............... 315/250 |

FOREIGN PATENT DOCUMENTS

| | | |
|---|---|---|
| JP | 2001-266387 | 9/2001 |
| JP | 2003-147203 | 5/2003 |
| JP | 2003-152367 | 5/2003 |

(Continued)

OTHER PUBLICATIONS

International Search Report issued Aug. 16, 2011 in International (PCT) Application No. PCT/JP2011/004001.

(Continued)

*Primary Examiner* — Laura Tso
(74) *Attorney, Agent, or Firm* — Wenderoth, Lind & Ponack, L.L.P.

(57) ABSTRACT

An object is to suppress precipitation and adhesion of an organotin compound in an optical module which is incorporated into an optical pickup device and so on. The optical pickup 100 includes light sources 1, 10, optical components 2, 3 transmitting light emitted from the light sources, a driving circuit 28 for driving the light sources, that is electrically connected to at least one component other than the driving circuit using solder 27a, 27b containing a flux, and heat radiating members 22a, 22b for radiating heat generated in the light sources 1, 10, wherein the heat radiating members 22a, 22b can generate only ethanol, or ethanol and methanol so that a proportion of ethanol is more than that of methanol.

10 Claims, 3 Drawing Sheets

(56) References Cited

FOREIGN PATENT DOCUMENTS

| | | |
|---|---|---|
| JP | 2006-139812 | 6/2006 |
| JP | 2006-190736 | 7/2006 |
| JP | 2007-200474 | 8/2007 |
| JP | 2007-290876 | 11/2007 |
| JP | 2008-88318 | 4/2008 |
| JP | 2010-15645 | 1/2010 |
| JP | 2010-53331 | 3/2010 |
| JP | 2010-168590 | 8/2010 |

OTHER PUBLICATIONS

International Preliminary Report on Patentability issued Mar. 21, 2013 in International (PCT) Application No. PCT/JP2011/004001.

* cited by examiner (a)

(b)

OPTICAL MODULE

FIELD OF THE INVENTION

The present invention relates to an optical module including a light source, an optical system that transmits light emitted from the light source and a heat radiating member that radiates heat generated at the light source, the optical module being suited to configure optical pickup devices, laser projectors, exposure apparatuses and the like.

BACKGROUND ART

There have recently been developed and manufactured optical pickup devices for recording or reproducing information on or from optical information recording media such as CDs (Compact Discs), DVDs (Digital Versatile Discs), and BDs (Blu-ray Discs).

For example, as shown in Patent Literature 1, such an optical pickup device includes a light source (for example, a semiconductor laser) and an optical element that transmits light emitted from the light source (for example, an objective lens). The light source includes a heat radiating member that is fixed to components such as a device body and a holder through an adhesive, and radiates heat during emission of laser light. An optical pickup device circuit component such as a driver IC that drives the light source is solder mounted on a circuit patterned on a flexible printed board or a printed board, and solder is also used to electrically connect the optical pickup device circuit component to the light source. Usually, the solder contains, as a catalyst, a flux (containing rosin acid and a hydrogenated rosin acid component as main components) so as to improve soldering property.

Herein, a mixture, that contains aluminum oxide as a main component, and also contains a curable substance having a property capable of curing in air added therein, is used as the material of the heat radiating member for the following reason. This mixture can be easily applied to components such as a holder since it has fluidity before curing, and also can surely radiate heat after curing since aluminum oxide has high heat conductivity. Those capable of generating an alcohol by hydrolysis and condensation reactions to thereby undergo curing are used as the curable substance. The thus generated alcohol is, for example, methanol. When the curable substance is selected so that the generated alcohol contains much more methanol, the time required for curing of the curable substance becomes shorter. In order to cure the curable substance within a comparatively short time, the curable substance may be selected so that only methanol is generated.

RELATED ART LITERATURES

Patent Literature

Patent Literature 1 JP-A-2006-139812

SUMMARY OF INVENTION

Problems to be Solved by the Invention

Examples of a problem of an optical pickup device include that degradation of optical characteristics such as signal amplitude proceeds at a comparatively high speed in a given number of optical pickup devices among the produced optical pickup devices. Specifically, in a given number of optical pickup devices, for example, degradation proceeds too quickly to endure use for a long time such as several hundreds of hours, or degradation breakdown occurs. In the manufacture of optical pickup devices, it is preferred to reduce the number of generation of optical pickup devices that are likely to undergo degradation as small as possible. In order to solve this problem, the present inventors have researched the cause of this problem. As a result, they have found that the above-mentioned degradation or degradation breakdown are caused by adhesion of an organotin compounds such as a dibutyltin dihydrogenated rosin acid component to an optical component and/or a light source and an increase in the amount of adhesion with the lapse of time.

In the optical pickup device, rosin acid and a hydrogenated rosin acid are contained as a flux of solder. The flux is vaporized by heat generated from a light source during operation of the optical pickup device. In order to avoid this problem, it is considered to be effective to add, as a flux component, a compound other than rosin acid and hydrogenated rosin acid. However, it is not easy to find the compound and put it into practical use. Therefore, the present inventors have studied about prevention of precipitation of the organotin compound and adhesion of the organotin compound to optical components or the like without varying flux components. The present invention has been made so as to achieve an object of providing an optical module which is less likely to undergo degradation of optical characteristics, caused by precipitation of the organotin compound, even after use for a long time (for example, 1,000 hours).

Means to Solve the Problems

As a result of further study of the present inventors, it has been found that the organotin compound is precipitated by mixing methanol and a flux component vaporized in the interior of an optical pickup device. It has hitherto been considered that methanol is generated from a heat radiating member. As a result of still further study, it has been found that precipitation of the organotin compound is effectively suppressed by forming a heat radiating member using a curable substance that generates much more ethanol.

That is, the present invention provides an optical module including a light source that emits light; an optical component that transmits light emitted from the light source; a driving circuit for driving the light source, that is electrically connected to at least one component other than the driving circuit using solder containing a flux; and a heat radiating member for radiating heat generated at the light source; wherein the heat radiating member can generate only ethanol, or can generate ethanol and methanol so that the proportion of the ethanol is more than that of the methanol.

In the optical module of the present invention, solder is preferably used so as to electrically connect the light source to the driving circuit.

In the optical module of the present invention, the heat radiating member can preferably generate only ethanol, or ethanol and methanol so that the proportion of methanol becomes 20% by weight or less when ethanol and methanol are combined to make 100% by weight.

In the optical module of the present invention, the heat radiating member can preferably generate only ethanol, or ethanol and methanol by hydrolysis and condensation reactions of a substance contained in the heat radiating member during curing of the substance.

In the optical module of the present invention, the heat radiating member preferably contains 85 to 95% by weight aluminum oxide, and 1 to 10% by weight in total a polymer having a methoxysilyl group at its terminal and a polymer having an ethoxysilyl group at its terminal.

In the optical module of the present invention, the light source may be retained by the retaining member and the retaining member may be fixed to a base through an adhesive. In that case, a thermal expansion coefficient of the heat radiating member is preferably less than that of the adhesive. Specifically, the value of the linear expansion coefficient of the heat radiating member preferably accounts for 70% or less of the linear expansion coefficient of the adhesive.

An optical pickup device, a laser projector or an exposure apparatus is preferably provided with the optical module of the present invention.

Effect of the Invention

According to the present invention, generation of an organotin compound can be suppressed in an optical module including a light source, an optical component that transmits light emitted from the light source, a heat radiating member and a driving circuit, wherein solder is used so as to electrically connect the driving circuit to at least one component other than the driving circuit. Whereby, the adhesion of the organotin compound to an optical component and/or a light source is suppressed, and thus making it possible to effectively suppress degradation of performances in the early stage of a product including an optical module incorporated therein.

BRIEF DESCRIPTION OF THE DRAWINGS

FIG. 3(a) is a graph showing relation between the laser driving current and the luminous output in a conventional optical pickup device, while FIG. 3(b) is a graph showing relation between the laser driving current and the luminous output in an optical pickup device according to the embodiment of the present invention.

MODES FOR CARRYING OUT THE INVENTION

First Embodiment

An optical pickup device including an optical module will be described as the first embodiment. In the optical pickup device of the first embodiment, it is not necessary that the optical module exists as an independent component. It is not necessary that the group of components and elements that configure the optical module is orderly distinguished from other components or elements that configure the optical pickup device. It is also possible to say that those, in which components and elements that configure the optical module as well as other components and elements coexist in one base or substrate, also belong to the optical pickup device including an optical module. This also applies to products other than the optical pickup device including an optical module incorporated therein. In the optical module in the first embodiment, the optical component that transmits light is, for example, a lens, a mirror, and a wavelength plate.

1. Configuration of Optical Pickup Device

The configuration of an optical pickup device 100 will be described as an embodiment of an optical pickup device of the present invention with reference to FIG. 1. The optical pickup device 100 can be used for a personal computer, an optical disk player, and an optical disk recorder and the like.

Figure 1:
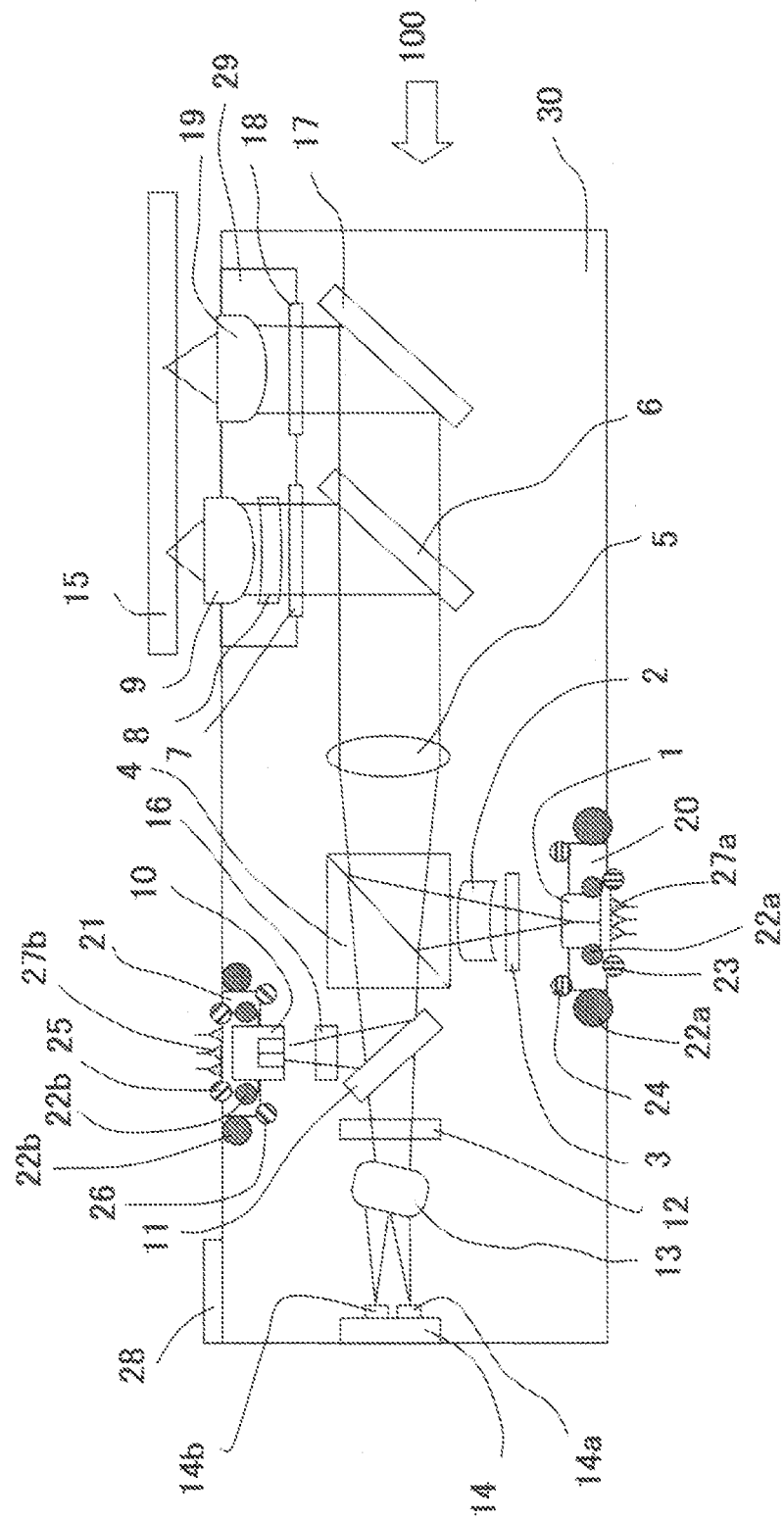
FIG. 1 is a schematic view showing a configuration example of an optical pickup device according to an embodiment of the present invention.

FIG. 1 is a schematic view showing the configuration of the optical pickup device 100. The optical pickup device 100 includes a lens holder 29, and a base 30 on which a first retaining member 20 that retains a bluish violet laser 1, and a second retaining member 21 that retains a red/infrared laser 10 are provided. On the lens holder 29, a λ/4 plate 7 for bluish violet light, a diffraction lens 8, an objective lens 9 for bluish violet light, a λ/4 plate 18 for red/infrared light, and an objective lens 19 for red/infrared light are provided. On the base 30, a relay lens 2, a λ/2 plate 3 for bluish violet light, a beam splitter 4, a collimating lens 5, a flip-up mirror 6 for bluish violet light, a plate beam splitter 11, a first diffraction element 12, a detection lens 13, a detector unit 14 including a light receiving element 14a and a light receiving element 14b, a second diffraction element 16, and a flip-up mirror 17 for red/infrared light are provided. On the base 30, an optical pickup device circuit means 28, as a driving circuit, equipped with a driver IC or the like for driving the bluish violet laser 1 and the red/infrared laser 10 is also provided. An optical disk 15 shows an optical disk placed on a disk tray (not shown).

In this optical pickup device 100, optical components configuring the optical module include the relay lens 2, the λ/2 plate 3 for bluish violet light, the beam splitter 4, the collimating lens 5, the mirror 6, the λ/4 plate 7 for bluish violet light, the diffraction lens 8, the lens 9, the diffraction element 12, the detection lens 13, the detection unit 14, the diffraction element 16, the mirror 17, the λ/4 plate 18 for red/infrared light, and the lens 19. In particular, the relay lens 2, and the λ/2 plate 3 for bluish violet light exert an influence on performances of the optical pickup device when the above-mentioned adhesion of the organotin compound occurs.

The bluish violet laser 1 is a light source for BD, and is configured to emit light with a center wavelength 405 nm. The bluish violet laser 1 can be realized by a semiconductor laser. The bluish violet laser 1 as the light source is usually provided by attaching to a holder called a CAN package. The bluish violet laser 1 is fixed to the first retaining member 20 by a first fixation means 23 such as a UV adhesive, and the first retaining member 20 is also fixed to the base 30 by a second fixation means 24 such as a UV adhesive.

The red/infrared laser 10 is a light source for DVD and CD, and is configured to emit two kinds of lights with center wavelengths of 660 nm and 785 nm. The red/infrared laser 10 can be realized by a semiconductor laser. The red/infrared laser 10 as the light source is usually provided by attaching to a holder called a CAN package or a frame package. The red/infrared laser 10 is fixed to the second retaining member 21 by a third fixation means 25 such as a UV adhesive, and the second retaining member 21 is also fixed to the base 30 by a fourth fixation means 26 such as a UV adhesive.

The optical pickup device circuit means 28 is configured by a flexible printed board or a printed board, and solder 27a is used for electrical connection to the bluish violet laser 1, while solder 27b is used for electrical connection to the red/infrared laser 10.

When the bluish violet laser 1 and the red/infrared laser 10 emit light, heat is generated. It is necessary to radiate the thus generated heat so that the temperature of the bluish violet laser 1 and the red/infrared laser 10 does not increase. Unless heat radiation is carried out, it becomes impossible to control the emission of light due to thermal runaway, or the semiconductor deteriorates due to heat, resulting in shortened lifetime thereof. Therefore, the heat radiating member is arranged so as to be in contact with the bluish violet laser 1 and the red/infrared laser 10, and/or arranged at the position where the temperature is likely to rise due to transfer of heat from the bluish violet laser 1 and the red/infrared laser 10. Specifically, a heat radiating member 22a is arranged between the bluish violet laser 1 and the first retaining member 20 and between the first retaining member 20 and the base 30, and radiates heat generated by the bluish violet laser 1. A heat radiating member 22b is arranged between the red/infrared laser 10 and the second retaining member 21 and between the second retaining member 21 and the base 30, and radiates heat generated by the red/infrared laser 10.

The heat radiating members 22a and 22b are formed by applying a mixture containing a substance having high thermal conductivity and a condensation type one-component liquid curable substance to the above positions, and then curing the curable substance.

The substance having high thermal conductivity is a main component of the mixture and is, for example, aluminum oxide (alumina), aluminum nitride, boron nitride, silicon nitride, magnesium oxide, crystalline or amorphous silica (silicon oxide), a metal powder such as silver or copper, zinc oxide, or graphite. In the present embodiment, a substance having heat conductivity of 2 to 5 W/(m·K) is preferably used and, for example, aluminum oxide is preferably used.

The one-component liquid curable substance is a substance having the following property. That is, the curable substance has high fluidity in a state where it is not in contact with moisture in air after sealing, and is cured when exposed in air, and also generates an alcohol in case of curing. Examples of the curable substance having such a property include alkylalkoxysilane in which at least one alkoxy group and at least one alkyl group are bonded to silicon, a polymer having a reactive silyl group such as an alkoxysilyl group at its terminal and the like. In the present embodiment, heat radiating members 22a and 22b can generate only ethanol, or ethanol and methanol. Therefore, when the heat radiating members 22a and 22b can generate only ethanol, the alkoxy group is an ethoxy group. When the heat radiating members 22a and 22b can generate ethanol and methanol, the alkoxy group is an ethoxy group and a methoxy group.

More specifically, the alkylalkoxysilane is silane in which an alkyl group having 1 to 10 carbon atoms and a methoxy group or an ethoxy group as an alkoxy group are bonded, for example, methylmethoxysilane and methyltriethoxysilane.

The polymer having an alkoxysilyl group at its terminal is a polymer having, at least one terminal, a silyl group represented by the following formula:

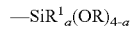

wherein $R^1$ is a hydrocarbon group having 1 to 10 carbon atoms, and preferably a methyl group, R is a methyl group or an ethyl group, and different $R^1(s)$ may be present in one alkoxysilyl group when a is 2 or more.

There can be selected, as a main chain of the polymer having an alkoxysilyl group at its terminal, one used generally as a main chain of a silicone resin and a modified silicone resin, such as polyoxyalkylene, a vinyl polymer (for example, polyacrylate, polymethacrylate, etc.), a saturated hydrocarbon polymer, an unsaturated hydrocarbon polymer, polyester, polycarbonate and polydimethylsiloxane and the like. The main chain may be a homopolymer, or a copolymer in which two or more repeating units are polymerized. Also, a divalent substituent may be present between a main chain and an alkoxysilyl group.

There is no particular limitation on the molecular weight of the polymer. When the molecular weight is small, the heat radiating member may sometimes become brittle after curing. When the molecular weight is large, viscosity of the substance increases before curing and thus it may sometimes become difficult to apply. The molecular weight may be, for example, from about 1,000 to 60,000.

The curable substance is not limited to the above substance. Any substance, that has a property of curing when exposed to air, and also generates only ethanol, or methanol and ethanol during curing, can be used in the present embodiment as long as it can form a heat radiating member.

When an alkylalkoxysilane or an alkoxy group (RO—) in the polymer having an alkoxysilyl group at its terminal is exposed in air, it is hydrolyzed by moisture in air. Whereby, silanol in which a hydroxyl group (—OH) is bonded to silicon (Si) in place of an alkoxy group, or a polymer having a hydroxyl group at its terminal, and an alcohol (R—OH) are produced. Furthermore, condensation occurs between a hydroxyl group and a hydroxyl group to form a siloxane bond. The substance produced by such hydrolysis and condensation is hard and plays a role of fixing a heat radiating member to a predetermined position.

In the heat radiating member of the optical pickup device, an alcohol is generated and vaporized while a final user uses the optical pickup device for the following reason. That is, in the manufacture of the optical pickup device, the entire curable substance in the heat radiating member does not undergo a reaction and partially remains, and an alcohol was produced during curing of the curable substance but the alcohol remains in the heat radiating member without vaporization. The degree of curing (end point of curing) of the curable substance is influenced by temperature and humidity during curing. Therefore, the curable substance is sufficiently cured during the manufacture of the optical pickup device and curing is completed. Even if the generation of the alcohol is not recognized, curing further proceeds by a change in operating environment, and thus an alcohol is generated and this alcohol may be sometimes vaporized. The alcohol remaining in the curable substance may be sometimes vaporized depending on the operating environment. Therefore, in the optical pickup device that is sold as the product and used, the heat radiating member is in a state of being capable of generating an alcohol.

When an alcohol, particularly methanol, is vaporized and exists together with a flux component of a vaporized solder, as mentioned above, a precipitate (for example, an organotin compound) adheres to optical components (a relay lens 2, a λ/2 plate 3 for bluish violet light, etc. in FIG. 1) and a semiconductor laser. In order to avoid this adhesion, the heat radiating member is formed by selecting a curable substance so that only ethanol can be generated, or ethanol can be generated in the proportion that is more than that of methanol. Specifically, these curable substances are mixed so that the amount of an alkylalkoxysilane having an ethoxy group as an alkoxy group or a polymer having an alkoxysilyl group with an ethoxy group as an alkoxy group at its terminal, is larger than that of an alkylalkoxysilane having a methoxy group as an alkoxy group or a polymer having an alkoxysilyl group with a methoxy group as an alkoxy group at its terminal. Whereby, degradation of performances of the optical pickup device due to adhesion of the precipitate can be prevented.

The heat radiating member is preferably a heat radiating member that can generate methanol and ethanol so that the proportion of methanol becomes 20% by weight or less when ethanol and methanol are combined to make 100% by weight. When the proportion of methanol that can be generated is 20% by weight or less, degradation of performances of the optical pickup device can be effectively prevented. It is necessary that a mixing ratio of a curable substance having a methoxy group to a curable substance having an ethoxy group is adjusted taking reactivity of the substances into consideration so as to decrease the amount of methanol generated. Since the curable substance capable of generating methanol during curing shows a curing rate higher than that of a curable substance capable of generating ethanol, the curable substance capable of generating methanol prevents formation of heat radiating members 20a and 22b from taking too much time, to ensure manufacturing efficiency of an optical pickup device. When the proportion of the curable substance capable of generating methanol is up to 20% by weight, and preferably from 1% by weight to 20% by weight, based on the entire curable substance, effects of the present invention can be obtained by adjusting the manufacture efficiency of the optical pickup device within a practical range.

A flux component of solder, ethanol, methanol, or a mixture thereof were charged in a glass bottle, and then a precipitation test was carried out under the environment of about 85° C. As a result, a precipitation (an organotin compound) was generated in a test in which only the flux component and methanol were charged in a glass bottle. While, in a test in which only the flux component and ethanol were charged in the glass bottle, and a test in which the flux component and a mixed alcohol (80% by weight of ethanol and 20% by weight of methanol) were charged in the glass bottle, a precipitation was scarcely generated. From these results, the above preferable proportion of methanol is determined.

The heat radiating member contains, for example, 85 to 95% by weight aluminum oxide and 1 to 10% by weight a silyl group-terminated polymer. The heat radiating member may further contain methyltrimethoxysilane and/or ethyltrimethoxysilane. In that case, the total amount of a silyl group-terminated polymer and such silane(s) is preferably from 1 to 10% by weight. The heat radiating member may further contain about 2 to 3% by weight of boron and a compound thereof.

The first fixation means 23, the second fixation means 24, the third fixation means 25 and the fourth fixation means 26 are adhesives (UV adhesive) having a property capable of curing by irradiation with ultraviolet light, and are epoxy-based or acrylic adhesives. The linear expansion coefficient of the UV adhesive is from about 44 to 180 ($\times 10^{-6}$ 1/K) for an epoxy-based adhesive, or from about 38 to 160 ($\times 10^{-6}$ 1/K) for an acrylic adhesive. The value of the linear expansion coefficient of the heat radiating members 22a and 22b preferably accounts for 70% or less of that of the linear expansion coefficient of the fixation means 23, 24, 25 and 26 for the following reason. That is, when the value of the linear expansion coefficient of the heat radiating member 22 is large, expansion and contraction of the heat radiating members 22a and 22b due to heating or cooling become larger than those of the fixation means 23, 24, 25 and 26 and thus an adverse influence is exerted on positional shift of a light source (a bluish violet laser 1, a red/infrared laser 10). When positional shift occurs in the light source, the position of detection light to be applied to a detector unit 14 shifts to cause asymmetry in servo signal, and thus control may sometimes become impossible. Therefore, the material of the heat radiating members 22a and 22b is selected so that the value of the linear expansion coefficient of the heat radiating members 22a and 22b accounts for 70% or less of that of the fixation means 23, 24, and 26.

Figure 2:
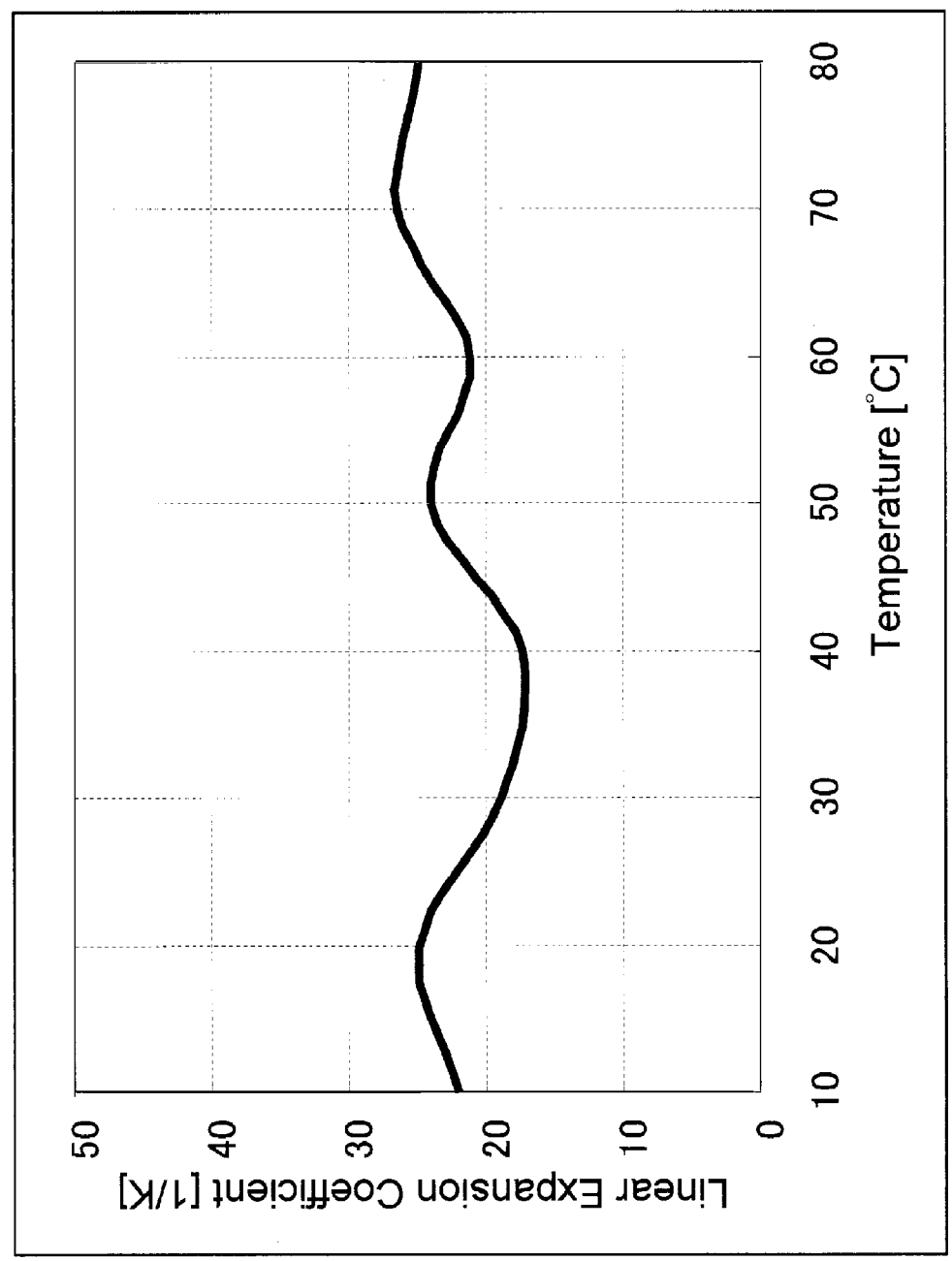
FIG. 2 is a graph for explaining a linear expansion coefficient of a heat radiating member according to the embodiment of the present invention.

FIG. 2 is a graph showing the temperature and the linear expansion coefficient after curing the heat radiating members 22a and 22b. The heat radiating members 22a and 22b contain 85 to 95% by weight aluminum oxide and 1 to 10% by weight a silyl group-terminated polymer. The linear expansion coefficient was measured by varying the temperature using a thermomechanical analyzer. In FIG. 2, the abscissa denotes a temperature (° C.), while the ordinate denotes a linear expansion coefficient ($\times 10^{-6}$ 1/K). As is apparent from FIG. 2, a maximum value of the linear expansion coefficient of the heat radiating member 22 is 26.4 ($\times 10^{-6}$ 1/K) at 70° C. and this value accounts for 70% or less of the linear expansion coefficient of the fixation means 23, 24, 25 and 26.

The heat radiating members 22a and 22b having a maximum linear expansion coefficient, that accounts for 70% or less of a minimum linear expansion coefficient of the fixation means 23, 24, 25 and 26, were incorporated into the optical pickup device 100, and then a thermal shock test that shows environmental reliability was carried out. The conditions are as follows:

at −30° C. for 0.5 hour, at +70° C. for 0.5 hour
1 cycle: 1 hour
100 cycles

Even after 100 cycles, positional shift of detection light scarcely occurred in the optical pickup device, and stable control could be performed.

2. Operation of Optical Pickup Device

The temperature of each position in the optical pickup device 100 with the configuration in FIG. 1 will be described. This description is description for easier understanding of the present embodiment and a description is not made using a strict value. Specific temperatures and the like are for illustrative purpose only.

In order to prevent a problem of quality of the product, the optical pickup device 100 is designed so that a surface temperature of a body product equipped with the optical pickup device 100 (for example, a personal computer or an optical disk recorder, etc.) becomes within a range from 0 to 40° C. Assumption is made that the surface temperature of a personal computer equipped with the optical pickup device 100 was 40° C. when the bluish violet laser 1 of the optical pickup device is operating. In this case, for example, a surface temperature of the optical pickup device 100 is about 60° C. When the surface temperature of the optical pickup device 100 reaches the above temperature, the surface temperature of the bluish violet laser 1 varies depending whether or not operation is performed with a reproducing power or a recording power, and becomes within a range from about 65° C. to about 80° C. by the effect of the heat radiating member 22b. When the surface temperature of the bluish violet laser 1 is within the above temperature, the flux component which is adhered to solders 27a, 27b used to fix the first retaining member 20 and the second retaining member 21 for retaining the bluish violet laser 1 and the red/infrared laser 10 to the base 30, or adhered to the vicinity thereof, is vaporized.

Even if the flux component is vaporized, since the proportion of methanol to be generated from the heat radiating members 22a and 22b accounts for 20% by weight or less of that of alcohol to be generated from the heat radiating members 22a and 22b in the optical pickup device 100 with the configuration shown in FIG. 1, the organotin compound is scarcely precipitated and also adheres to optical components in a small amount. Since the value of the linear expansion coefficient of the heat radiating members 22a and 22b accounts for 70% or less of that of the fixation means 23, 24, 25 and 26, it is possible to reduce positional shift of the light source caused by an influence of the heat radiating members 22a and 22b.

Figure 3:
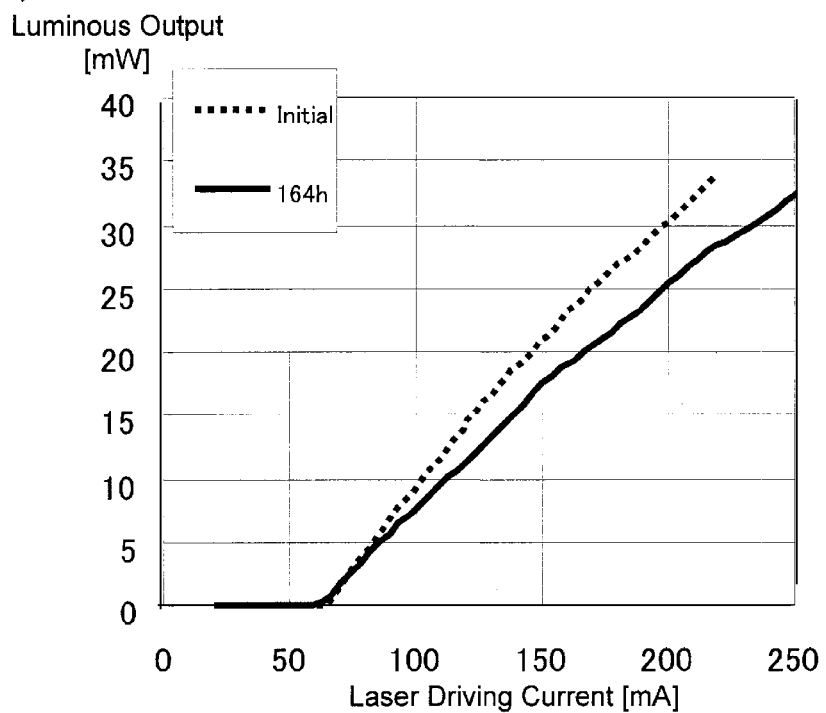
Figure 3:
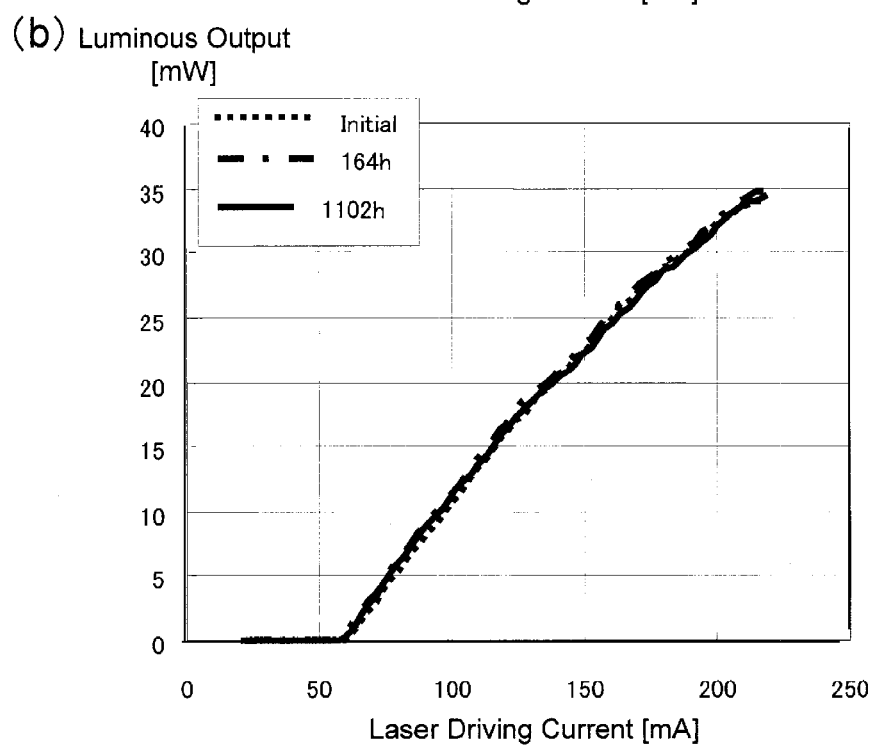

It will be explained with reference to FIG. 3 that degradation of performances is less likely to be caused by precipitation of an organotin compound in the optical pickup device 100 of the present embodiment. FIG. 3(a) is a graph showing relation between the laser driving current and the luminous output in a conventional optical pickup device, while FIG.

3(b) is a graph showing relation between the laser driving current and the luminous output in an optical pickup device according to the embodiment of the present invention. The measurement was carried out by measuring a luminous output of a semiconductor laser using an optical power meter while applying a driving current to a red/infrared semiconductor laser. The measurement environment is 60° C.

When a conventional optical pickup device is driven for 164 hours, a laser driving current required to obtain the same luminous output becomes increase. This is because an organotin compound adheres to optical components during driving to cause a decrease in light transmittance of optical components. When a large current is continuously applied, defects inside the semiconductor laser increase, resulting in shorted lifetime. Also, kink occurs and thus it becomes impossible to obtain a power required to record information on a disk.

In contrast, after driving the optical pickup device 100 of the present embodiment for 164 hours, a laser driving current required to obtain the same luminous output scarcely changed, and the laser driving current scarcely changed even after driving for 1,102 hours. This reveals that a decrease in light transmittance of optical components caused by precipitation of an organotin compound does not occur in the optical pickup device 100 of the present embodiment. As is apparent from these results, the optical pickup device 100 of the present embodiment has longer lifetime.

3. Summary

In the optical pickup device 100 of the present embodiment, the heat radiating member 22 generates only ethanol, or ethanol and methanol by a hydrolysis-condensation reaction when curing further proceeds, and/or vaporization of ethanol or methanol that remains in the heat radiating member 22. When methanol and ethanol are generated, the proportion of ethanol is more than that of methanol, and the proportion of methanol preferably accounts for 20% by weight or less of the total amount of the methanol and ethanol generated. Whereby, precipitation of the organotin compound, that causes degradation of optical characteristics, can be suppressed in the optical pickup device 100.

In the optical pickup device 100 of the present embodiment, the value of the linear expansion coefficient of the heat radiating members 22a and 22b accounts for 70% or less of that of the fixation means 23, 24, 25 and 26. Whereby, positional shift of the light source can also be suppressed.

Therefore, the present embodiment makes it possible to obtain an optical pickup device that has long product lifetime and high reliability.

OTHER EMBODIMENTS

An optical pickup device with the configuration shown in FIG. 1 was shown as the first embodiment of the present invention. However, the present invention is not limited to the above embodiment and also can be realized in other embodiments. Other embodiments of the present invention will be collectively described hereinafter.

For example, in other embodiments, the heat radiating member in the optical pickup device may be a heat radiating member that contains 80 to 90% by weight aluminum oxide and 10 to 20% by weight a polymer having an alkoxysilyl group at its terminal. In this case, since the linear expansion coefficient of the heat radiating member becomes 74.1 ($\times 10^{-6}$ 1/K), it is necessary that the linear expansion coefficient of the fixation means is adjusted to 105.9 ($\times 10^{-6}$ 1/K) or more.

Examples of other embodiments include a laser projector and an exposure apparatus, that include an optical module including:

a light source that emits light, an optical component that transmits light emitted from the light source, a driving circuit for driving the light source, that is electrically connected to at least one component other than the driving circuit using solder containing a flux; and a heat radiating member for radiating heat generated at the light source, wherein the heat radiating member can generate only ethanol, or can generate ethanol and methanol so that the proportion of the ethanol is more than that of the methanol.

Also in the laser projector, and the exposure apparatus to be used for formation of a pattern in the manufacture of a semiconductor, since light emitted from the light source (particularly, a semiconductor laser) is applied to the object after transmitting optical components, there arises a problem described in connection with the optical pickup device. Therefore, lifetime and reliability of these apparatuses can also be improved by applying the present invention to the apparatuses. Elements (for example, fixation means that satisfies a predetermined relation with a linear expansion coefficient of the heat radiating member) described in connection with the optical pickup device may also be applied in these apparatuses. Alternatively, the present invention can be optionally applied to an optical apparatus using an optical module in which light emitted from a light source (particularly, a semiconductor laser) is applied to the object after transmitting optical components.

INDUSTRIAL APPLICABILITY

The present invention is directed to an optical module that is less likely to undergo time-lapse degradation, and is applicable to apparatuses including optical pickup devices, such as reproducing apparatuses (players), recording apparatuses (recorders) and personal computers, as well as laser projector, exposure apparatus and the like.

DESCRIPTION OF REFERENCE NUMERALS

1: Bluish violet laser
2: Relay lens
3: $\lambda/2$ plate for bluish violet light
4: Beam splitter
5: Collimating lens
6: Flip-up mirror for bluish violet light
7: $\lambda/4$ plate for bluish violet light
8: Diffraction lens
9: Objective lens for bluish violet light
10: Red/infrared laser
11: Plate beam splitter
12: First diffraction element
13: Detection lens
14: Detector unit
15: Optical disk
16: Second diffraction element
17: Flip-up mirror for red/infrared light
18: $\lambda/4$ plate for red/infrared light
19: Objective lens for red/infrared light
20: First retaining member
21: Second retaining member
22: Heat radiating member
23: First fixation means
24: Second fixation means 25: Third fixation means
26: Fourth fixation means
27a: Solder
27b: Solder
28: Optical pickup device circuit means
29: Lens holder
30: Base
100: Optical pickup device

The invention claimed is:

1. An optical module comprising:
a light source that emits light,
an optical component that transmits light emitted from the light source,
a driving circuit for driving the light source, that is electrically connected to at least one component other than the driving circuit using solder containing a flux; and
a heat radiating member for radiating heat generated at the light source, wherein
the heat radiating member can generate only ethanol, or can generate ethanol and methanol so that the proportion of the ethanol is more than that of the methanol.

2. The optical module according to claim 1, wherein solder is used to electrically connect the light source and the driving circuit.

3. The optical module according to claim 1, wherein the heat radiating member can generate ethanol and methanol so that the proportion of methanol becomes 20% by weight or less when ethanol and methanol are combined to make 100% by weight.

4. The optical module according to claim 1, wherein the heat radiating member can generate ethanol and methanol by hydrolysis and condensation reactions of a substance contained in the heat radiating member during curing of the substance.

5. The optical module according to claim 1, wherein the heat radiating member contains 85 to 95% by weight aluminum oxide, and 1 to 10% by weight in total a polymer having a methoxysilyl group at its terminal and a polymer having an ethoxysilyl group at its terminal.

6. The optical module according to claim 1, wherein:
the light source is retained by a retaining member and the retaining member is fixed to a base through an adhesive; and
a thermal expansion coefficient of the heat radiating member is less than a thermal expansion coefficient of the adhesive.

7. The optical module according to claim 6, wherein a linear expansion coefficient of the heat radiating member is 70% or less of a linear expansion coefficient of the adhesive.

8. An optical pickup device comprising an optical module according to claim 1.

9. A laser projector comprising an optical module according to claim 1.

10. An exposure apparatus comprising an optical module according to claim 1.

* * * * *